March 3, 1959 V. A. BARKER 2,876,291

TELEPHONE CALL INTERCEPTING SYSTEM

Filed July 9, 1956 3 Sheets-Sheet 1

INVENTOR.
VICTOR A BARKER
BY McWalter Owen
ATTY

March 3, 1959 V. A. BARKER 2,876,291

TELEPHONE CALL INTERCEPTING SYSTEM

Filed July 9, 1956 3 Sheets-Sheet 2

INVENTOR.
VICTOR A. BARKER

BY Wm. Watts Owen

ATTY.

March 3, 1959 V. A. BARKER 2,876,291

TELEPHONE CALL INTERCEPTING SYSTEM

Filed July 9, 1956 3 Sheets-Sheet 3

INVENTOR.
VICTOR A. BARKER

BY McWatters Owen

ATTY.

United States Patent Office 2,876,291
Patented Mar. 3, 1959

2,876,291

TELEPHONE CALL INTERCEPTING SYSTEM

Victor A. Barker, Los Angeles, Calif., assignor to General Telephone Laboratories, Incorporated, a corporation of Delaware Application July 9, 1956, Serial No. 596,489

13 Claims. (Cl. 179—27)

The present invention relates in general to telephone systems, and more particularly, to improvements in call intercepting apparatus to be used in automatic telephone exchanges, for intercepting calls to certain stations on the party lines of the system.

In telephone systems of the character indicated, when one or more of the subscriber stations on a party line have been taken out of service or disconnected from the line, it is desirable, on calls made to such stations or to non-existing lines, that the calling party be advised in some manner that the called party cannot be reached, in order to reduce wasted calls and avoid tying up switching equipment needlessly.

Also, in telephone systems of the character indicated, when there exists no corresponding telephone line or succeeding switching equipment from certain levels of selectors, it is desirable, on dialled calls made to such levels, that the call be diverted to an intercept trunk circuit where succeeding digits dialled will be absorbed before switching through to intercept service outlets.

Various systems have been devised to accomplish this purpose by transferring the call to an operator, but most of these systems have limitations of various kinds, such as high cost, or the use of special ringing systems or switching equipment, or excessive absorbing equipment.

It is an object therefore of the present invention to provide an intercept trunk circuit which absorbs extra digits before switching through to service outlets by timing the interdigital pause to determine when the last digit has been dialled.

Another object of the invention, is the provision of a first service, in a common intercept trunk circuit, for local call answering by an operator or mechanical recorder, and a second service of toll call answering by an operator or mechanical recorder.

Another object of the invention, is the provision in a common intercept trunk circuit for local answering on a first service by a mechanical recorder, with automatic transfer to a second service intercept operator after a predetermined time delay on the first service, and with automatic transfer to the second service operator after a predetermined number of complete transmission cycles of the mechanical recorder on one call.

A feature of the invention resides in the use of a two level rotary switch to delay connection of the intercepting trunk to the answering circuit by absorbing digits, which is re-used for bringing in an alarm after a mechanical answering circuit has been connected to the trunk for a predetermined time.

Figure 1:
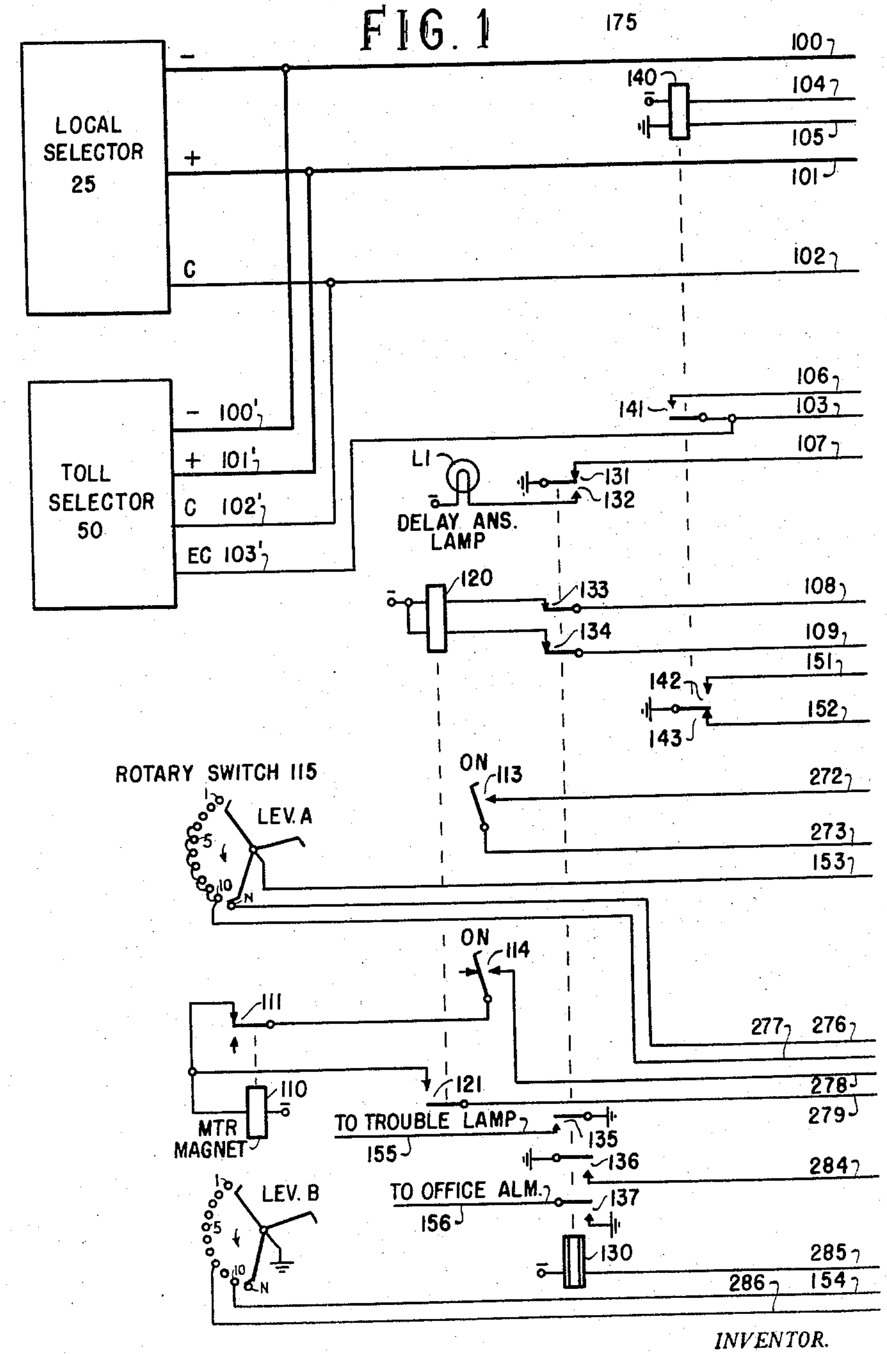
Figure 2:
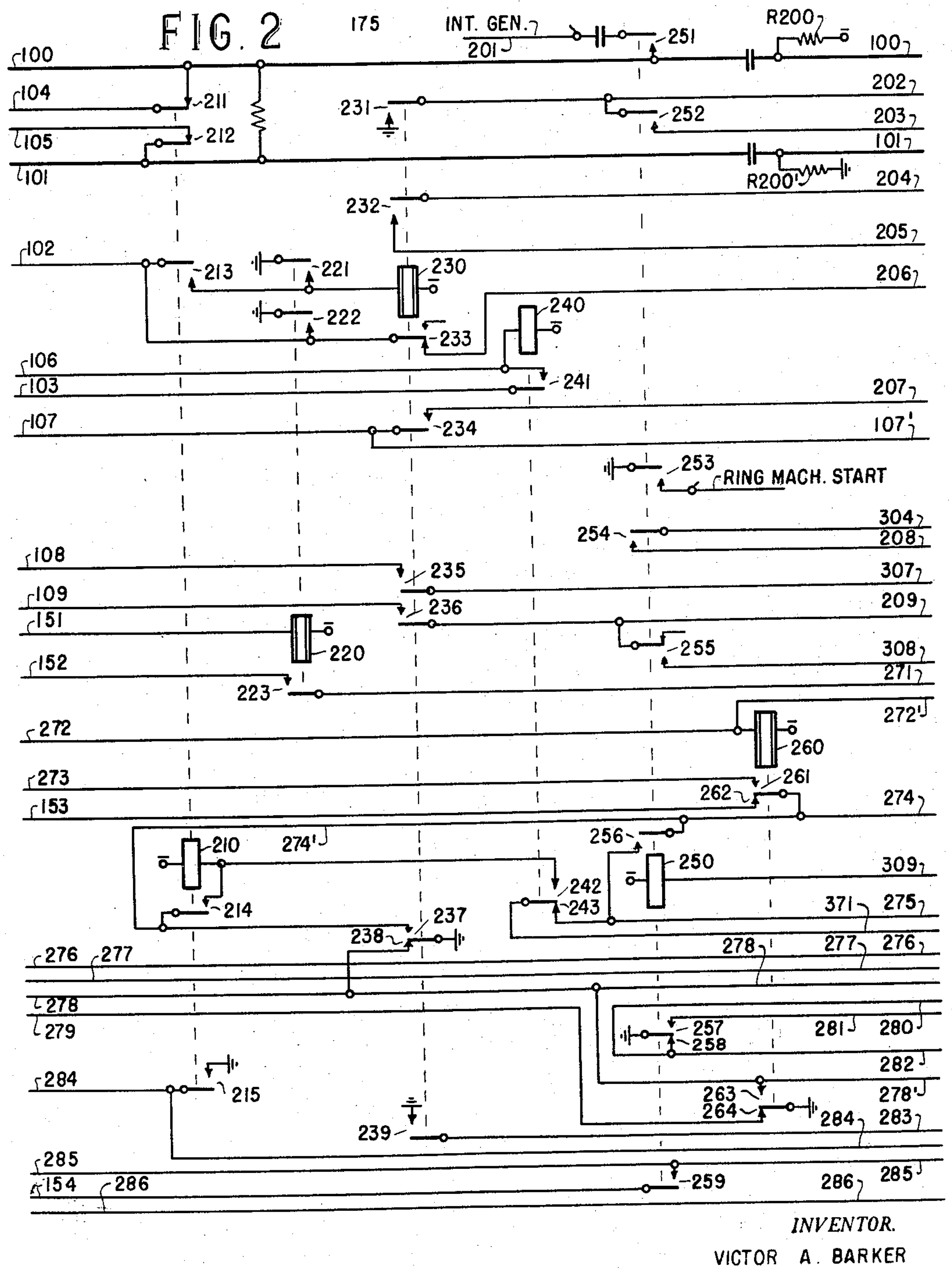
Figure 3:
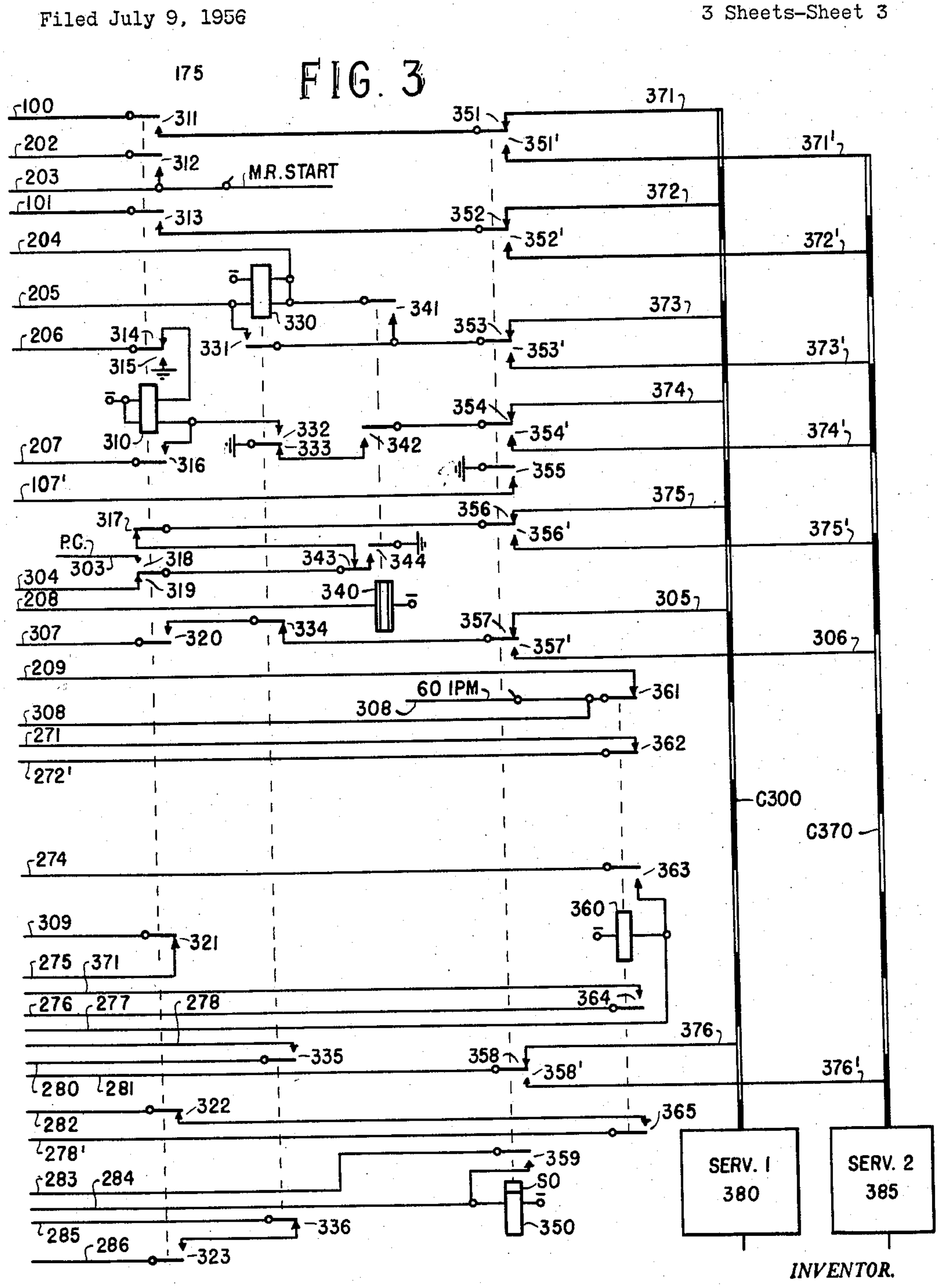

Other objects and features of the invention will be apparent from the specification and claims which follow, with due references to the attached drawings comprising Figs. 1 to 3 which are also a part of the specification.

In the drawings:

Figs. 1, 2, and 3, with Fig. 2 placed to the right of Fig. 1 and Fig. 3 placed to the right of Fig. 2, shows the intercept trunk circuit.

Referring to the drawings, Figure 1 shows a local selector 25 and a toll selector 50 both in block form and commonly connected to intercept trunk circuit 175, via unused levels of these selectors. In most cases a definite number of these intercept trunk circuits would be provided, according to the average requirements of the system, with facilities for connecting the various unused selector levels as needed. It is to be understood that these selectors can be of any rank i. e., a first selector, second selector, etc.

It has been a common practice to connect unused levels of selectors to an intercept operator's equipment prior to a calling party having dialled the entire intended series of digits. During such occurrences, the intercept operator upon answering may receive the clicking of the calling party's dial in her ear until the calling party completes his dialling, as he may be unaware that he dialled an incorrect or unused telephone directory number. To overcome such occurrences the present invention provides a digit absorber as part of the intercept trunk circuit. The digit absorber in part consists of a two level, ten point rotary switch 115. When the present intercept trunk circuit is seized, a circuit is completed for pulsing the rotary switch at the rate of sixty interruptions per minute (one interruption per second). Depending on the rank of the selector that has accessed this circuit, a variable number of digits must be dialled and absorbed before the calling party is closed through to the intercept service. With each digit dialled, a self-interrupting circuit is completed for rotating the wipers of the rotary switch to their normal positions. The preceding seqeunce of operations is repeated until the last digit has been dialled. When the last digit is dialled, the rotary switch wipers continue to step at the rate of one bank contact per second, until the wipers reach predetermined bank contacts where a circuit is completed for signalling the intercept service or starting a mechanical recorder. Should an intercept operator fail to answer or the mechanical recorder fail to operate after a predetermined time, the rotary switch wipers will continue to step until they reach a predetermined bank contact to bring in an office alarm. Should the mechanical recorder fail to operate after a predetermined time, the call will be transferred to an intercept operator.

Referring to Fig. 3, there is shown Service 1 equipment 380 and Service 2 equipment 385. For convenience in explaining the forthcoming specification, it will be assumed that Service 1 is a mechanical recorder service and Service 2 is an intercept operator's switchboard and equipment service. It will be further assumed that local calls terminating in this trunk circuit will be connected through to Service 1, and toll calls terminating in this trunk circuit will be connected through to Service 2.

When a local call has been connected through to the mechanical recorder, a recorded announcement will be sent back to the calling party, which is repeated in cycles. After each cycle of the recorder announcement, the rotary switch is pulsed one time to step the wipers one step onto the bank contacts. Should the calling party listen to a predetermined number of cycles, and the rotary switch wipers have stepped accordingly, an office alarm will be initiated, and the call will be transferred to Service 2 and the intercept operator.

When the intercept operator fails to answer a toll call or a transferred local call, the rotary switch will be stepping the wipers over the bank contacts, and after a predetermined time the wipers will reach a specific bank contact and initiate an office alarm and a delay answer lamp. The calling party will then have the option of either hanging up or waiting to see whether or not the operator will answer the delay signal notification.

The bank contacts of level A of rotary switch 115 are ten in number, including a normal position N. A 60 I. P. M. source is provided for stepping the wipers at the rate of one bank contact per second when the intercept trunk circuit 175 is seized by a selector. Contacts 4 to 10 are multipled together and control the extension of the loop circuit and signalling to the intercept service outlets. The first three bank contacts of level A are open contacts and correspond to a three second interdigital pause. In other words, after the intercept trunk 175 is seized it is assumed that within three seconds the calling party will dial the next digit, whereby this digit will be absorbed and the circuit including the wiper and the fourth bank contact will be opened to prevent extension of the loop to the intercept service outlets. Instead, a self-interrupting circuit is completed to the rotary switch to step the wipers to their normal positions at a rapid rate. This absorption and timing of the dialled digits will continue until the last digit has been dialled, whereby after four seconds the extension to the intercept service outlets will be completed. It is to be understood, that should it be felt that the interdigital pause is too short or too long in time, then the multiple strapping of the rotary switch could be changed accordingly i. e., start the multiple strapping with bank contact 5 for a five second interdigital pause or start the multiple strapping with the third bank contact for a two second interdigital pause.

The level B of rotary switch 115 is the alarm control level, and also consists of ten bank contacts and a normal bank contact N. On this level, ground is directly connected to the three corresponding wipers. The first seven and the ninth bank contacts are open contacts, and the eighth and tenth contacts are associated with an alarm relay. As previously mentioned, after each cycle of a recorded announcement from the mechanical recorder, the rotary switch wipers take one step. When eight cycles are transmitted, the ground wiper of level B will rest on the eighth bank contact and operate the alarm relay to initiate an alarm. During a mechanical recorder failure on local calls or a failure of the intercept operator answering on toll calls, the wipers of the rotary switch will be stepping at the rate of one bank contact per second, and when the wiper of level B reaches the tenth bank contact the alarm relay will operate to initiate an alarm. On calls switched to the mechanical recorder and in the event of the mechanical recorder failure mentioned, the operation of the alarm relay will also in turn transfer the call to the intercept operator.

A detailed explanation will now follow:

*Toll selector to intercept trunk*

Assuming that the toll selector 50 is seized during dialling of a toll call, a loop circuit is completed through preceding toll equipment (not shown) from the calling party in a manner well-known in the art. Assuming that the next digit dialled into the toll selector 50, is a digit corresponding to an unused level. In other words, a level on the selector which is not connected to succeeding equipment because no corresponding telephone number would exist, i. e. no group of connectors having access to a plurality of telephone lines in this exchange. The wipers of the selector would instead rotate over this level in search of an idle intercept trunk circuit, such as 175. We will further assume that upon rotation of the wipers of toll selector 50, that intercept trunk circuit 175 has been found idle.

Intercept trunk circuit 175 is marked idle to the toll selector by battery through the upper winding of relay 310 (Fig. 3) on the C lead 102'; the circuit extending from battery, non-inductive upper winding of relay 310, contacts 314, conductor 206 (Fig. 2), contacts 233, C conductors 102, 102', to ground through a test relay at the toll selector 50. When sized, a loop circuit is closed over negative and positive conductors 100' and 101' respectively. Over this loop circuit, relay 140 operates; the circuit extending from battery, upper winding of relay 140, conductor 104, contacts 211, negative conductors 100 and 100', through the subscriber loop, positive conductors 101' and 101, contacts 212, conductor 105, lower winding of relay 140, to ground. Upon operation of relay 140, at contacts 141, a circuit is completed for operating relay 240 (Fig. 2); the circuit extending from battery, winding of relay 240, conductor 106, contacts 141, to ground on the EC lead 103 from the toll selector 50. At contacts 142, a circuit is completed to relay 220 (Fig. 2); the circuit extending from battery, winding of relay 220, conductor 151, contacts 142, to ground. The operation of relay 240, at contacts 241 completes an obvious holding circuit for said relay via ground on the EC lead 103. At contacts 242 a circuit is prepared for operating relay 210. The operation of relay 220, at contacts 221, closes an obvious circuit for operating relay 230. At contacts 222, ground is returned over the C leads 102 and 102' to busy this trunk to other selectors, such as local selector 25, and to hold the preceding toll switch train in a well-known manner. At contacts 223 a circuit is prepared to relay 260. The operation of relay 230, at contacts 231, prepares a circuit to the Mechanical Recorder Start Circuit. At contacts 232 a short circuit is prepared across relay 330. At contacts 233 a circuit is opened to relay 310. At contacts 234 a holding circuit is prepared to relay 310. At contacts 235 a circuit is prepared to the upper winding of relay 120. At contacts 236 a circuit is closed to send 60 interruptions per minute ground to the lower winding of relay 120 to intermittently operate relay 120; the circuit extending from battery, lower winding of relay 120, contacts 134, conductor 109, contacts 236 (Fig. 2), conductor 209, contacts 361 (Fig. 3), conductor 308 to 60 I. P. M. ground. At contacts 237, ground is placed on the level A wiper of rotary switch 115; the circuit extending from ground, contacts 237, conductor 274', contacts 262, conductor 153, to the wiper. At contacts 239 a holding circuit is prepared to relay 350.

Relay 120 pulses at the rate of one pulse per second, and each time relay 120 operates, at contacts 121 a circuit is completed to operate the motor magnet 110; the circuit extending from battery, winding of magnet 110, contacts 121, conductor 279, contacts 264 (Fig. 2), to ground. When relay 120 restores during the intermittent pulses, contacts 121 open to restore the motor magnet 110 and advance the level A and B wipers of rotary switch 115 one step in a counter-clockwise direction. Upon the wipers advancing the first step from their normal positions, the off-normal springs "on" operate, closing "on" contacts 113 and 114.

*Absorbing the dialled digits (toll)*

Depending on the rank of the switch that has accessed this intercept trunk circuit, a variable number of digits must be absorbed by this circuit before the calling party is closed through to the intercept service. This is accomplished by determining whether or not the last digit has been dialled. The interdigital pause is timed, and if it reaches a duration of four seconds, it is assumed that the last digit is dialled.

When the first digit is dialled, relay 140 intermittently restores upon receipt of the first of a series of digital impulses. Upon restoration, relay 140, at contacts 141, opens a circuit to relay 240, however, relay 240 remains operated via the holding party previously mentioned. At contacts 142, the circuit to relay 220 is opened, however, relay 220 being slow-to-release remains operated throughout the impulse series. At contacts 143, a circuit is completed to relay 260; the circuit extending from battery, winding of relay 260, conductor 272', contacts 362 (Fig. 3), conductor 271, contacts 223, conductor 152, contacts 143 (Fig. 1), to ground. The operation of relay 260, at contacts 261, completes a holding path for said relay; the circuit extending from battery, winding of relay 260, conductor 272, "on" contacts 113, conductor 273, contacts 261; conductor 274′, contacts 237, to ground. At contacts 262, ground is removed from the level A wiper of rotary switch 115. At contacts 264 the 60 I. P. M. circuit to the motor magnet 110 is opened, however, at contacts 263, a self-interrupter path is completed thereto; the circuit extending from battery, winding of magnet 110, contacts 111, "on" contacts 114, conductor 278, contacts 263 to ground. Over the last mentioned path, motor magnet 110, by means of its interrupter spring contacts 111, commences to step the wipers of switch 115 at a rapid rate self-interruptedly to their normal positions.

When the wipers of rotary switch 115 reach their normal positions (N), the off-normal springs operate. "On" contacts 114 open the circuit to motor magnet 110. "On" contacts 113 open the holding circuit to relay 260 however, relay 260 being slow-to-release remains operated from intermittent ground at contacts 143 should relay 140 still be pulsing upon receipt of digital impulses. At the end of the dialled digit, relay 140 remains operated and removes intermittent ground from contacts 143 long enough to restore relay 260 after a short time. The restoration of relay 260, at contacts 262 re-closes ground to the level A wipers of the rotary switch 115. The opening of contacts 263 and "on" contacts 114 opens the self-interrupter circuit to the rotary magnet 110. At contacts 264 the original 60 I. P. M. path to the rotary magnet 110 is closed whereby, at the end of the first digit dialled motor magnet 110 is again under the control of relay 120 which steps the wipers one step per second after every digit dialled.

For every succeeding digit dialled, the intermittent restoration of relay 140 operates relay 260, which in turn, completes the self-interrupter circuit to motor magnet 110 which rapidly steps the wipers to their normal positions, as described for the first digit dialled. However, after the last digit has been dialled and four seconds have elapsed (depending upon the number of digits required to complete the intended call), relay 140 would no longer intermittently restore, and relay 260 would not operate to open the 60 I. P. M. circuit to motor magnet 110. Instead, motor magnet 110 would be under the control of the 60 I. P. M. source, to permit the wipers to step only one bank contact per second, and to at least step the wipers to the fourth bank contacts of each level of the rotary switch.

Should the calling end fail to dial at all after selector 50 has seized trunk circuit 175, or delays dialling of a subsequent digit in excess of four seconds, the call will be extended to the Service 2 operator in a manner disclosed with reference to a four second pause after the last digit has been dialled. This would occasionally occur when the calling end was aware that she had dialled the wrong number, or for some reason waited too long before dialling an intended subsequent digit.

*Signalling the intercept operator (toll)*

After the last digit has been dialled, and relay 260 has restored, or the calling party has failed to dial or waited four seconds after a certain amount of digits have been dialled, when the rotary switch wipers under the control of 60 I. P. M. reach their fourth bank contacts, ground on the level A wiper of switch 115 is closed to relay 360 (Fig. 3); the circuit extending from battery, winding of relay 360, conductor 277, through the multiple bank contacts 10, 9, 8, 7, 6, 5, 4, of level A of the rotary switch 115, conductor 153, contacts 262, conductor 274, contacts 237, to ground. The operation of relay 360, at contacts 361, opens the 60 I. P. M. ground to relay 120, restoring relay 120, which in turn, opens the circuit to motor magnet 110 at contacts 121. At contacts 362 the circuit to relay 260 is further opened. At contacts 363 a holding circuit for relay 360 is closed; the circuit extending from battery, winding of relay 360, contacts 363, conductors 274, 274′, contacts 237, to ground. At contacts 364 a circuit is prepared to relay 210. At contacts 365 an alternate circuit to motor magnet 110 is completed; the circuit extending from battery, winding of magnet 110, interrupter spring contacts 111, "on" contacts 114, conductors 278, 278′, contacts 365, 322, conductor 282, contacts 258, to ground. Over the last mentioned path motor magnet 110 is energized to step the wipers self-interruptedly to their normal positions (N). Upon the wipers of rotary switch 115 reaching their normal position (N), the off-normal springs operate thereby opening "on" contacts 114 to restore the motor magnet 110. Also, upon the wiper of level A reaching the normal position, a circuit is completed for operating relay 210; the circuit extending from battery, winding of relay 210, contacts 242, conductor 371, contacts 364, conductor 276, level A, normal bank contact N of rotary switch 115, wiper, conductor 153, contacts 262, conductor 274′, contacts 237, to ground. The operation of relay 210, at contacts 211 and 212, opens the circuit to relay 140, which thereby restores. At contacts 213 an obvious alternate circuit is completed for holding relay 230 operated from ground forwarded over the C conductor 102′. At contacts 214, a locking circuit for relay 210 is closed via ground at contacts 237. At contacts 215, a circuit is completed for operating relay 350; the circuit extending from battery, winding of relay 350, conductor 284, contacts 215, to ground. The restoration of relay 140, at contacts 141, opens the circuit to relay 240 however, relay 240 remains operated via its holding path. At contacts 142, the circuit to relay 220 is opened, restoring relay 220 after a short delay due to its slow-to-release characteristic. Relay 350 being slow-to-operate, operates after a short delay, and at contacts 351′ and 352′ the extension of the loop circuit is prepared to the intercept operator at Service 2. At contacts 353′ a circuit is prepared to relay 330. At contacts 354′ a ground circuit is prepared to the Automatic Desk Start Circuit Group Multiple. At contacts 355 a circuit is prepared to relay 310. At contacts 356′ a circuit is prepared to the Automatic Desk Common Start Circuit. At contacts 357′ a circuit is prepared to the Operator Answer Circuit. At contacts 358′ a circuit is prepared to an answer lamp at the intercept operator's switchboard. At contacts 359 a holding circuit is completed to relay 350; the circuit extending from battery, winding of relay 350, conductor 283, contacts 239, to ground. The restoration of relay 220 at contacts 221 opens the original operating path for relay 230 however, relay 230 remains operated from ground forwarded over the C conductor 102′. At contacts 222 the original ground for holding the preceding equipment during seizure is opened however, the preceding equipment is held through a reversal in polarity. At contacts 223 the circuit to relay 260 is further opened.

The dry trunk condition resulting from the operation of relay 210 gives an indication to the toll switchboard operator that the trunk is ready to receive ringing. Ringing is initiated by the toll operator momentarily opening the EC lead 103, by means of a key (not shown) which restores relay 240. The restoration of relay 240 at contacts 241 opens the holding circuit to this relay. At contacts 242 the original operating circuit for relay 210 is opened however, relay 210 remains operated over the holding path previously mentioned. At contacts 243 a circuit to relay 250 is closed; the circuit extending from battery, winding of relay 250, conductor 309, contacts 321, conductor 275, contacts 243, conductor 371, contacts 364, conductor 276, normal bank contact N of level A of the rotary switch 115, wiper, conductor 153, contacts 262, conductor 274′, contacts 237, to ground. The operation of relay 250 at contacts 251 closes ringback tone to the calling party over the negative side of the line from an interrupter generator source. At contacts 252 a circuit is completed to the Mechanical Recorder Start Circuit; the circuit extending from ground, contacts 231, conductor 202, contacts 252, conductor 203, to the Mechanical Recorder Start Circuit. At contacts 253 a circuit is completed to the Ringing Machine Start Circuit. At contacts 254 a circuit is closed to operate relay 340; the circuit extending from battery, winding of relay 340, conductor 208, contacts 254, conductor 304, contacts 319, 343, 317, 356′, cable C370, to ground from Service 2 equipment 385. At contacts 255 a 60 I. P. M. ground circuit is closed to the lower winding of relay 120; the circuit extending from battery, lower winding of relay 120, contacts 134, conductor 109, contacts 236, 255, conductor 308, to 60 I. P. M. ground. At contacts 256, a holding path to relay 250 is closed; the circuit extending from battery, winding of relay 250, conductor 309, contacts 321, conductor 275, contacts 256, conductor 274′, contacts 237, to ground. At contacts 257 a circuit to the intercept operator's answer lamp (not shown) is completed; the circuit extending from resistance battery to the lamp in the Service 2 equipment 385, cable C370, conductor 376′, contacts 358′, conductor 281, contacts 257, to ground. At contacts 259, a circuit is prepared to relay 130. The operation of relay 340, at contacts 341, a circuit is prepared to relay 330. At contacts 342 a circuit to the Automatic Desk Start Circuit in Service 2 is prepared. At contacts 343, the original operating circuit for relay 340 is opened however, at contacts 344 a holding path to this relay is completed; the circuit extending from battery, winding of relay 340, conductor 208, contacts 254, conductor 304, contacts 319, 344, to ground.

*Intercept operator answers (toll)*

Before the intercept operator answers the call, ground pulses from the 60 I. P. M. generator, pulse relay 120 at the rate of one pulse per second, consequently advancing the rotary switch wipers at the rate of one step per second. When the operator answers the call, ground is closed over conductor 373′ to operate relay 330; the circuit extending from ground at Service 2 equipment 385, cable C370, conductor 373′, contacts 353′, 341, upper winding of relay 330, to battery. The operation of relay 330, at contacts 331 closes a multiple holding path for this relay; the first circuit extending from battery, winding of relay 330, conductor 204, contacts 232, conductor 205, contacts 331, 353′, conductor 373′, cable C370, to ground at the Service 2 equipment 385, and the second circuit extending from ground at contacts 331, lower winding of relay 330, upper winding of relay 330, to battery. At contacts 332, an obvious operating circuit to relay 310 is completed. At contacts 333, the path to the Automatic Desk Start Circuit Group Mulitple is opened. At contacts 334 a homing circuit for the rotary switch is prepared. The operation of relay 310 at contacts 311 and 313 switches the loop circuit through the Service 2 and the intercept operator. At contacts 312 a holding circuit to the Mechanical Recorder Start Circuit is completed over an obvious path. At contacts 316, a multiple holding circuit for relay 310 is closed; the first circuit extending from battery, winding of relay 310, contacts 316, conductor 207, contacts 234, conductor 107′, contacts 355 (Fig. 3), to ground and the second circuit via contacts 234, conductor 107, contacts 131 (Fig. 1), to ground. At contacts 315 a ground circuit is prepared for holding the preceding equipment. At contacts 317 the prepared circuit to the Automatic Desk Common Start Circuit is opened. At contacts 318 an obvious circuit is completed to the peg count lead 303, to take a peg count registration. At contacts 319, the circuit to relay 340 is opened, restoring relay 340. At contacts 320, a circuit to the upper winding of relay 120 is prepared. At contacts 321, the circuit to relay 250 is opened, restoring relay 250. At contacts 322, a circuit is prepared to the motor magnet 110. At contacts 323, the closing thereof having no significance at this time.

The restoration of relay 250, at contacts 251, removes the ring back tone from the trunk. At contacts 252, the original path to the Mechanical Recorder Start Circuit is opened however, the circuit remains closed over the alternate circuit previously described. At contacts 253, the Ringing Machine Start Circuit is opened. At contacts 254, the circuit to relay 340 is further opened. At contacts 255, the circuit to pulsing relay 120 is opened, restoring relay 120. At contacts 256, the original holding path to relay 250 is opened. At contacts 257, the circuit to the intercept operator's answer lamp is opened, extinguishing the lamp. At contacts 258, a circuit to the motor magnet 110 is completed; the circuit extending from battery, winding of magnet 110, interrupter contacts 111, "on" contacts 114, conductors 278, 278′, contacts 365, 322, conductor 282, contacts 258, to ground. Contacts 259 closing, having no effect at this time. Relay 340 being slow-to-release restores after a short delay. The restoration of relay 340, at contacts 341 opens the original operating path to relay 330 however, relay 330 remains operated over its holding path. At contacts 342, the circuit to the Automatic Desk Start Circuit Group Multiple is opened. At contacts 344, the circuit to the peg count lead 303 is opened. By means of its self-interrupter spring contacts 111, motor magnet 110 steps the wipers of rotary switch 115 to their respective normal positions (N), to thereby operate the "on" springs. At "on" contacts 114, the self-interrupted circuit of motor magnet 110 is opened, restoring motor magnet 110. "On" contacts 113 opening, having no effect at this time. The Service 2 intercept operator is now able to converse with the calling party; the circuit extending via the loop, negative conductors 100′, 100, condenser (Fig. 2), contacts 311, 351′, conductor 371′, cable C370, through the intercept operator's headset at the Service 2 switchboard, cable C370, conductor 372′, contacts 352′, 313, positive conductor 101, condenser (Fig. 2), conductor 101′, and back through the loop. Transmission battery and ground being provided for the intercept operator via resistors R200 and R200′ (Fig. 2) respectively. The intercept operator will thereby notify the calling party that a wrong, or a non-existing number, has inadvertently been dialled.

*Release (toll)*

When the calling subscriber hangs up upon notification of the wrong number dialled, ground is removed from the C conductor 102′. This removal of ground restores relay 230. The restoration of relay 230 at contacts 231 opens the circuit to the Mechanical Recorder Start lead. At contacts 232, removes the short circuit from relay 330. At contacts 234 the multiple holding path for relay 310 is opened however, relay 310 remains operated from ground at contacts 332. At contacts 233, a ground from contacts 315 is placed on the C conductor 102, and 102′ to prevent seizure until the switch train completely releases. At contacts 235 and 236 further opens circuits to relay 120. At contacts 237, the circuits to relays 210 and 360 are opened, restoring relays 210 and 360. At contacts 239, the circuit to relay 350 is opened. The restoration of relay 210 at contacts 211 and 212 prepares a circuit to relay 140, for future seizure thereof. At contacts 213, the circuit to relay 230 is further opened. At contacts 215, the holding path to relay 350 is opened, restoring relay 350. The restoration of relay 350, closes contacts 351, 352, 353, 354, 356, and 357 to transfer the intercept trunking circuit to Service 1. At contacts 351′ and 352′ the extended loop circuit to the intercept operator is further opened. At contacts 353′, the circuit to relay 330 is opened to restore relay 330. The restoration of relay 360, at contacts 361 prepares 60 I. P. M. ground for future pulsing of relay 120. At contacts 362 a circuit to relay 260 is prepared for future use. The restoration of relay 330, at contacts 332 opens the circuit to relay 310, restoring relay 310. The restoration of relay 310, at contacts 311 and 313 further opens the loop circuit. At contacts 315, ground is removed from the C conductors 102 and 102′, and at contacts 314 replaces battery on the C conductors 102 and 102′ to permit seizure of this trunk. This intercept trunk circuit is now available for seizure.

*Intercept operator fails to answer (toll)*

Assuming that the intercept operator fails to answer upon the calling party signalling the intercept operator, as described in "Signalling the Intercept Operator," the rotary switch wipers would be stepping at the rate of one step per second under the control of relay 120. When the level "B" wiper of rotary switch 115 reaches the tenth bank contact, ground is closed to relay 130; the circuit extending from battery, winding of relay 130, conductor 285, contacts 259, conductor 154, tenth bank contact and wiper of level "B" of the rotary switch, to ground. The operation of relay 130 at contacts 132 closes an obvious circuit to operate the Delay Answer Lamp L1. At contacts 133 and contacts 134, the circuit to relay 120 is opened, relay 120 restoring. At contacts 135, a circuit is completed to operate the Display Panel Trouble lamp. At contacts 136, a multiple circuit is closed to relay 350; the circuit extending from battery, winding of relay 350, conductor 284, contacts 136, to ground. At contacts 137 a circuit is completed to initiate a delayed office alarm. The restoration of relay 120, at contacts 121 opens the self-interrupter circuit to the motor magnet 110. The level "A" and "B" wipers of the rotary switch 115 will thus rest on their respective tenth bank contacts.

Should the intercept operator answer after the delayed answering alarm, the circuit would be completed in a manner disclosed in "Intercept Operator Answers," with the exception that when relay 330 operates at contacts 335, the self-interrupter circuit to the motor magnet 110 would be completed to step the wipers off of the tenth bank contact of level "B" to restore relay 130. Relay 130 upon restoring, would in turn cut off the delayed answering alarm, and extinguish the lamp L1 and trouble lamp.

*Release: After intercept operator fails to answer*

Assuming that the calling party releases when the intercept operator fails to answer, ground is removed from the C conductor 102'. Relay 230 restores, and at contacts 231 opens the circuit to the Mechanical Recorder Start lead. At contacts 232, the short circuit to the upper winding of relay 330 is opened. At contacts 233 battery is connected to C conductors 102 and 102'. Contacts 235 and 236 further open a circuit to relay 120. At contacts 237, the holding circuits to relay 210, 250, and 360 are opened, restoring these relays. At contacts 238, a circuit to operate the motor magnet 110 is closed; the circuit extending from battery, winding of magnet 110, contacts 111, "on" contacts 114, conductor 278, contacts 238, to ground. At contacts 239, the holding path to relay 350 is opened.

Motor magnet 110 proceeds to step self-interruptedly. When the wipers step off of the tenth bank contact, the circuit to relay 130 is opened. Relay 130 being slow-to-release remains operated for a short duration. When the wipers reach their normal positions (N), the "on" springs operate to cut-off the self-interrupter circuit and to restore the motor magnet 110 in a manner previously described.

The restoration of relay 210, at contacts 211 and 212 closes relay 140 across the negative and positive conductors, for future seizure. At contacts 213, relay 230 is removed from the C conductor. At contacts 215, the original operating circuit to relay 350 is opened. The restoration of relay 250, at contacts 251 removes ring-back tone from the trunk. At contacts 253, the ringing machine start circuit is opened. At contacts 254, the circuit to relay 340 is opened, relay 340 restoring after a short duration. At contacts 257, the circuit to the answer lamp is opened to extinguish the lamp.

The restoration of relay 360, at contacts 361 prepares

60 I. P. M. ground to relay 120. The restoration of relay 340 at contacts 341 and 342 opens the circuits to Automatic Desk Service. The restoration of relay 350 at contacts 351', 352', 353', 354', 357' and 358' opens the circuits to Service 2. At contacts 351, 352, 353, 354, 356, 357 and 358 prepares circuits to Service 1.

The intercept trunk circuit 175 is now at normal.

*Local selector to intercept trunk*

Assuming that the local selector 25 is seized during dialling of a local call, a loop circuit is completed through the preceding equipment (not shown) and the calling party in a manner well-known in the art. Assuming that the next digit dailled into the local selector 25, is a digit corresponding to an unused level. In other words, as previously stated with respect to the toll selector 50, a level not corresponding to a telephone directory number in this exchange. The wipers of selector 25 would instead rotate over this level in search of an idle intercept trunk circuit, such as 175. We will further assume that upon rotation of the wipers of local selector 25, that intercept trunk circuit 175 has been found idle.

Intercept trunk circuit 175 is marked idle to the local selector by battery through the upper winding of relay 310 (Fig. 3) on the C lead 102; the circuit extending from battery, non-inductive upper winding of relay 310, contacts 314, conductor 206 (Fig. 2), contacts 233, C conductor 102, to ground through a test relay at the selector 25. When seized, a loop circuit is closed over negative and positive conductors 100 and 101 respectively. Over this loop circuit, relay 140 operates; the circuit extending from battery, upper winding of relay 140, conductor 104, contacts 211, negative conductor 100, through the subscriber's loop, positive conductor 101, contacts 212, conductor 105, lower winding of relay 140, to ground. The operation of relay 140, in closing contacts 141, has no effect since the EC lead 103 is open, and as is well-known EC leads generally do not correspond to local selectors. At contacts 142, an obvious circuit is completed over conductor 151 to operate relay 220. The operation of relay 220, at contacts 221 completes an obvious circuit to operate relay 230. At contacts 222, ground is placed on the C leads 102 and 102' to hold the preceding equipment, and busy this trunk to other selectors, such as toll selector 50. At contacts 223, a circuit is prepared to relay 260. The operation of relay 230, in closing contacts 231, prepares a circuit to the Mechanical Recorder Start Circuit. At contacts 232, a short circuit is prepared across relay 330. At contacts 233, battery is removed from the C lead 102. At contacts 234, a circuit is prepared to relay 310. At contacts 236, 60 I. P. M. ground is closed to relay 120; the circuit extending from battery, lower winding of relay 120, contacts 134, conductor 109, contacts 236, conductor 209, contacts 361, conductor 308, to 60 I. P. M. ground. At contacts 235, a circuit is prepared to the upper winding of relay 120. At contacts 237, a locking circuit is prepared to relay 250, and ground is placed on the level A wiper of rotary switch 115. At contacts 239, a circuit is prepared to relay 350.

Relay 120 pulses at the rate of one pulse per second. Each time relay 120 operates, at contacts 121 a circuit is completed to energize the motor magnet 110; the circuit extending from battery, winding of magnet 110, contacts 121, conductor 279, contacts 264, to ground. When relay 120 restores, the wipers of levels "A" and "B" of rotary switch 115 advance one step onto the bank contacts. Upon the said wipers advancing the first step from their normal positions (N), the off-normal springs "on" operate, closing "on" contacts 113 and 114.

*Absorbing the dialled digits (local)*

Depending upon the rank of the switch that has accessed this circuit, a variable number of digits must be absorbed before the calling party is closed through to Service 1. This is accomplished, as previously disclosed, by determining whether or not the last digit has been dialled.

When the first digit is dialled, relay 140 restores intermittently upon receipt of the series of digital impulses. Upon restoring, relay 140 at contacts 142 opens the circuit to relay 220 however, relay 220 is slow-to-release and remains operated throughout the series of digital impulses. At contacts 143, a circuit is closed to operate relay 260; the circuit extending from battery, winding of relay 260, conductor 272', contacts 362 (Fig. 3), conductor 271, contacts 223, conductor 152, contacts 143, to ground. The operation of relay 260, at contacts 261 closes a holding circuit for this relay; the circuit extending from battery, winding of relay 260, conductor 272, "on" contacts 113 (Fig. 1), conductor 273, contacts 261, conductor 274', contacts 237 (Fig. 2), to ground. At contacts 262, ground is removed from the level A wiper of the rotary switch 115. At contacts 264, the original circuit to motor magnet 110 is opened however, at contacts 263 a self-interrupter circuit to the motor magnet 110 is closed; the circuit extending from battery, winding of magnet 110, interrupter spring contacts 111, "on" contacts 114, conductors 278, 278', contacts 263, to ground. Over the last-mentioned path motor magnet 110 self-interruptedly commences to step the wipers to their normal positions.

When the wipers of rotary switch 115 reach their normal or home positions (N), the off-normal springs operate to open "on" contacts 113 and 114, to restore the motor magnet 110 and open the holding circuit to relay 260. At the end of the first dialled digit, relay 140 re-operates and at contacts 143 removes intermittent ground from relay 260, to restore relay 260. The restoration of relay 260, at contacts 264 again closes the 60 I. P. M. stepping circuit to motor magnet 110, under the control of contacts 121 of relay 120. The preceding sequence of operations is repeated until the last digit has been dialled.

For every succeeding digit dialled, the intermittent restoration of relay 140 operates relay 260, which in turn, completes the self-interrupter circuit to motor magnet 110 which rapidly steps the wipers to their normal positions, as described for the first digit dialled. However, after the last digit has been dialled and four seconds have elapsed (depending on the number of digits required to complete the intended call) relay 140 would no longer intermittently restore, thus relay 260 would not operate to open the 60 I. P. M. circuit to motor magnet 110. Instead, motor magnet 110 would be under the control of the 60 I. P. M. source, to permit the wipers to step only one bank contact per second, and to at least step the wipers to the fourth bank contact of each level of the rotary switch.

Should the calling end fail to dial at all after selector 25 has seized trunk circuit 175, or delays dialling of a subsequent digit in excess of four seconds, the call will be extended to the Service 2 operator in a manner disclosed with reference to a four second pause after the last digit has been dialled. This would occasionally occur when the calling end was aware that he had dialled the wrong number, or for some reason waited too long before dialling an intended subsequent digit.

After the last digit has been dialled, or the calling end fails to dial at all or waited four seconds after a certain amount of digits have been dialled, relay 140 operates or remains operated, which in turn operates or maintains relay 220 operated. Relay 120 at contacts 121 intermittently operates the motor magnet 110. The motor magnet 110 steps the wipers over the bank contacts of the rotary switch 115, and when the wipers reach the fourth bank contact, a circuit is closed to relay 360; the circuit extending from battery, winding of relay 360, conductor 277, the multiple bank contacts 10, 9, 8, 7, 6, 5, 4 of level A, wiper of level A, conductor 153, contacts 262, conductor 274', contacts 237, to ground.

The operation of relay 360, at contacts 361, opens the 60 I. P. M. ground to the pulsing relay 120, restoring relay 120. At contacts 362, the opening thereat having no significance at this time. At contacts 363, a holding path to relay 360 is completed; the circuit extending from battery, winding of relay 360, contacts 363, conductors 274, 274', contacts 237, to ground. At contacts 364, a circuit is prepared to relay 250. At contacts 365, a self-interrupter circuit to the motor magnet 110 is closed; the circuit extending from battery, winding of magnet 110, interrupter contacts 111, "on" contacts 114, conductors 278, 278', contacts 365, 322, conductor 282, contacts 258, to ground. By means of its self-interrupter contacts 111, motor magnet 110 self-interruptedly steps the wipers of rotary switch 115 to their normal position bank contacts N. Upon the wipers reaching their normal positions, the off-normal springs operate whereby, at "on" contacts 114 the self-interrupter circuit to motor magnet 110 is opened, restoring the motor magnet 110.

Upon the level A wiper of the rotary switch 115 reaching its normal position (N), a circuit is closed to operate relay 250; the circuit extending from battery, winding of relay 250, conductor 309, contacts 321, conductor 275, contacts 243, conductor 371, contacts 364, conductor 276, normal bank contact N and wiper of level A, conductor 153, contacts 262, conductor 274', contacts 237, to ground. The operation of relay 250, at contacts 251, closes ring-back tone from an interrupter generator source via conductor 201 to the calling party over the negative side of the line (negative conductor 100). At contacts 252, a circuit is closed to the Mechanical Recorder Start lead to start the mechanical recorder; the circuit extending from battery at the recorder, conductor 203, contacts 252, conductor 202, contacts 231, to ground. At contacts 253, an obvious circuit is completed to start the ringing equipment over the Ring Machine Start lead. At contacts 254, a circuit is prepared to relay 340. At contacts 255, 60 I. P. M. ground is closed to pulsing relay 120; the circuit extending from battery, lower winding of relay 120, contacts 134, conductor 109, contacts 236, 255, conductor 308, to intermittent ground. At contacts 256, a holding path is closed to relay 250; the circuit extending from battery, winding of relay 250, conductor 309, contacts 321, conductor 275, contacts 256, conductor 274', contacts 237, to ground. At contacts 257, a circuit is completed to the answer lamp at the mechanical recorder in Service 1; the circuit extending from ground, contacts 257, conductor 281, contacts 358, conductor 376, cable C300, to the mechanical recorder answer lamp in the Service 1 equipment 380. At contacts 259 a circuit is prepared to relay 130.

*Recorded message announcer responds*

The recorded message announcer closes ground to lead 375 momentarily at the beginning of each message cycle and then transfers the ground to leads 373 and 305 for the remainder of the cycle. At the beginning of the message cycle ground is closed to operate relay 340; the circuit extending from battery, winding of relay 340, conductor 208, contacts 254, conductor 304, contacts 319, 343, 317, 356, conductor 375, to ground. The operation of relay 340, at contacts 341 prepares a circuit to relay 330. Contacts 342 close however, having no effect at this time. At contacts 343, the original circuit for operating relay 340 is opened however, at contacts 344 which close before contacts 343 opens, completes a holding path for relay 340; the circuit extending from battery, winding of relay 340, conductor 208, contacts 254, conductor 304, contacts 319, 344, to ground. Upon transfer of the ground to lead 373, a circuit is completed to operate relay 330; the circuit extending from battery, upper winding of relay 330, contacts 341, 353, conductor 373, to ground. The operation of relay 330, at contacts 331 closes a holding path for this relay; the circuit extending from battery, upper winding of relay 330, conductor 204, contacts 232, conductor 205, contacts 331, 353, conductor 373, to ground. At contacts 332, an obvious circuit is closed to operate relay 310. At contacts 334, a prepared circuit to the Mechanical Recorder Answer Circuit is opened. Contacts 335 and 336 having no effect at this time. The operation of relay 310, at contacts 311 and 312 extends the loop to Service 1 equipment 380 and the recorder message announcer thereat; the loop circuit extending from negative conductor 100 (Figs. 1, 2, and 3), contacts 311, 351, cable C300, the mechanical recorder at Service 1 equipment 380, cable C300, conductor 372, contacts 352, 313, positive conductor 101 (Figs. 3, 2, 1), and through the calling parties loop. At contacts 312, an obvious alternate circuit to Mechanical Recorder Start Circuit is closed. At contacts 315, a ground is prepared to the C leads. At contacts 316, a holding path for relay 310 is closed; the circuit extending from battery, lower winding of relay 310, contacts 316, conductor 207, contacts 234, conductor 107, contacts 131 (Fig. 1), to ground. At contacts 318, a circuit is completed to lead 303 via ground at contacts 344 to take a peg count registration. At contacts 319, the circuit to relay 340 is opened, restoring relay 340 after a short duration. At contacts 321, the circuit to relay 250 is opened, restoring relay 250. The restoration of relay 250, at contacts 251 removes ring-back tone from the trunk. At contacts 252, the original path to the Mechanical Recorder Start circuit is opened however, the mechanical recorder remains operated over the alternate path previously disclosed. At contacts 253, the circuit to the Ringing Machine Start Circuit is opened to cut-off the ringing. At contacts 254, the circuit to relay 340 is further opened. At contacts 255, the 60 I. P. M. circuit to pulsing relay 120 is opened, restoring relay 120. At contacts 257, the circuit to the mechanical recorder answer lamp is opened, extinguishing the answer lamp. At contacts 258, a self-interrupter circuit to operate motor magnet 110 is closed; the circuit extending from battery, winding of magnet 110, interrupter contacts 111, "on" contacts 114, conductor 278, contacts 335, conductor 280, contacts 258, to ground. Motor magnet 110 by means of its self-interrupter contacts 111 steps the wipers of rotary switch 115 to their normal bank contact positions (N), thus opening "on" contacts 114 to restore the motor magnet 110. The restoration of relay 340, at contacts 341 opens the original operating circuit to relay 330 however, relay 330 remains operated over the holding path previously described. At contacts 344, the circuit to the peg count meter is opened.

At the end of the first cycle of the recorded announcement ground is removed from lead 373 and is transferred to leads 375 and 374. Relay 330 restores upon removal of ground from lead 373 whereby, at contacts 331 opens the holding circuit for this relay. At contacts 332 the operating path to relay 310 is opened however, relay 310 remains operated over its holding path. At contacts 334, a circuit is closed to operate relay 120 from ground on conductor 305; the circuit extending from battery, upper winding of relay 120, contacts 133, conductor 108, contacts 235, conductor 307, contacts 320, 334, 357, to ground. Relay 120 operates and at contacts 121 closes ground from contacts 264 to motor magnet 110, energizing the motor magnet 110. At the end of the cycle, the recorded message announcer then transfers ground from leads 375 and 305 to lead 373. The removal of ground from lead 305 restores relay 120, which in turn opens contacts 121 to denergize motor magnet 110. The deenergization of motor magnet 110 steps the wipers of rotary switch 115 to their respective first bank contacts.

*Calling party listens to eight message cycles*

The above pattern is repeated until the calling party restores. If the calling party listens to eight message cycles or if a trouble condition causes this to be seized for eight message cycles, then an alarm condition will be sounded in the office. When relay 120 restores for the eighth time and the wipers of rotary switch 114 rest on their respective eighth bank contacts, a circuit is completed to operate relay 130; the circuit extending from battery, winding of relay 130, conductor 285, contacts 336, 323, conductor 286, the eighth bank contact and the wiper of level B of the rotary switch 115, to ground. The operation of relay 130, at contacts 131 opens the circuit to relay 310, restoring relay 310. At contacts 132, an obvious circuit is completed for lighting the Delay Answer Lamp L1. At contacts 133, the circuit to relay 120 is opened. At contacts 134, an alternate prepared circuit to relay 120 is opened. At contacts 135, an obvious circuit is completed to operate the Trouble Lamp. At contacts 136, a circuit is closed to operate relay 350; the circuit extending from battery, winding of relay 350, conductor 284, contacts 136, to ground. At contacts 137, an obvious circuit is completed to initiate an office alarm. The restoration of relay 310, at contacts 311 and 313 opens the loop circuit to the recorded message announcer. At contacts 312, the circuit to the mechanical recorder start circuit is opened, restoring the mechanical recorder, which in turn cuts-off the recorded message. At contacts 314, battery is prepared to the C conductors 102 and 102'. At contacts 321, a circuit is prepared to relay 250. At contacts 322, a circuit is closed to operate motor magnet 110; the circuit extending from battery, winding of motor magnet 110, interrupter contacts 111, ON contacts 114, conductors 278, 278', contacts 365, 322, conductor 282, contact 258, to ground. The operation of relay 350, at contacts 351, 352, 353, 354, 356, 357, and 358 opens the circuits to Service 1, and at contacts 351', 352', 353', 354', 356', 357', and 358' transfers the circuits to Service 2. At contacts 359, a holding circuit for relay 350 is closed; the circuit extending from battery, winding of relay 350, contacts 359, conductor 283, contacts 239, to ground. By means of its self-interrupter contacts 111, motor magnet 110 steps the wipers self-interruptedly over the bank contacts of rotary switch 115. When the wipers of rotary switch 115 leave the eighth bank contacts, the circuit to relay 130 is opened, restoring relay 130 after a short duration. Upon the wipers of rotary switch 115 reaching their normal bank contact position (N), a circuit is closed to relay 250; the circuit extending from battery, winding of relay 250, conductor 309, contacts 321, conductor 275, contacts 243, conductor 371, contacts 364, conductor 276, normal bank contact and wiper of level A, conductor 153, contacts 262, conductor 274', contacts 237, to ground. The restoration of relay 130, at contacts 132 opens the circuit to extinguish the Delay Answer Lamp L1. At contacts 133 and 134, circuits are prepared to the upper and lower windings of relay 120. At contacts 135 and 137, the circuits to the trouble lamp and office alarm are opened, to extinguished and cut-off these signals respectively. At contacts 136, the circuit to relay 350 is opened however, relay 350 remains operated over its holding path. The operation of relay 250, at contacts 251 closes ring-back tone to the trunk. At contacts 252, a circuit to the mechanical recorder start circuit is closed. At contacts 253, the circuit to the Ring Machine Start Circuit is closed, to initiate ringing. At contacts 254, a circuit is closed to operate relay 340; the circuit extending from battery, winding of relay 340, conductor 208, contacts 254, conductor 304, contacts 319, 343, 317, 356', to ground on conductor 375 via Service 2 equipment 385. At contacts 255, 60 I. P. M. ground is closed to pulsing relay 120; the circuit extending from battery, lower winding of relay 120, contacts 134, conductor 109, contacts 236, 255, conductor 308, to 60 I. P. M. ground. At contacts 256, an obvious holding path via ground at contacts 237 is closed to relay 250. At contacts 257, a circuit is completed to operate the intercept operator's answer lamp at Service 2; the circuit extending from ground, contacts 257, conductor 281, contacts 358′, conductor 376′ to the lamp at the Service 2 equipment 385. At contacts 259, ground is closed to the tenth bank contact (level B) of rotary switch 115. The operation of relay 340, at contacts 341 closes the circuit to relay 330, which in turn closes a circuit to relay 310 in a manner previously disclosed. The remaining operation is the same as that disclosed in "Signalling the intercept operator (toll)," and thus, further detailed explanation is not felt to be necessary.

*Operator answers and releases*

The operator associated with Service 2 answers and releases in a similar manner explained in "Intercept operator answers (toll)" and "Release (toll)."

*Recorder failure*

In the event that the recorded message announcer has failed and is unable to respond to a demand for attention on Service 1, ground will not be closed to lead 375 to operate relay 340. Since the lower winding of relay 120 is closed to 60 I. P. M. ground, relay 120 will operate and restore once every second. When relay 120 operates, at contacts 121, a circuit is closed to motor magnet 120 over a path previously disclosed. When relay 120 restores, the wipers of rotary switch 115 advance one step. This process is repeated until the circuit times-out in ten seconds, and ground is closed over the tenth contact of level "B" to relay 130; the circuit extending from battery, winding of relay 130, conductor 285, contacts 259, conductor 154, tenth contact and wiper of level "B," to ground. The operation of relay 130 at contacts 132 operates the Delay Answer Lamp; at contacts 134 opens the circuit to relay 120; at contacts 135 and 137 lights the trouble lamp and initiates the office alarm; at contacts 136 completes a circuit to relay 350 over a path previously described. The operation of relay 350, at contacts 351, 352, 353, 354, 356, 357, and 358 opens these circuits to Service 1; at contacts 351′, 352′, 353′, 354′, 356′, 357′, and 358′ close these circuits to Service 2; at contacts 359 relay 350 locks operated from ground at contacts 239. Relay 340 operates from ground forwarded over conductor 375′. Ground is again forwarded over conductor 376′ to operate the intercept operator's answer lamp in Service 2. Relay 340 operates, and at contacts 341 prepares a circuit to lead 373′; at contacts 342 completes a circuit to the Automatic Desk Common Start Circuit; at contacts 344 completes a locking circuit for relay 340 over a path previously described.

The Service 2 intercept operator upon answering, responds by closing ground to lead 373′ to operate relay 330. Relay 330 operates whereby, at contacts 331 locks operated; at contacts 332 closes a circuit to operate relay 310; at contacts 334 opens the circuit to the Operator's Answer Circuit; at contacts 335 prepares a circuit to the motor magnet. Relay 310 operates whereby, at contacts 311 and 313 closes the loop through to the Service 2 intercept operator; at contacts 316, relay 310 locks operated; at contacts 321 opens the circuit to relay 250. Relay 250 restores whereby, at contacts 251 cuts-off ringback tone; at contacts 253 cuts-off the ringing machine; at contacts 254 opens the circuit to restore relay 340; at contacts 257 the circuit to the answer lamp is opened, extinguishing this lamp; at contacts 259 opens the circuit to relay 130; at contacts 258 a self-interrupter circuit to the motor magnet 110 is closed. Relay 340 restoring, at contacts 341 opens the operating circuit to relay 330 however, relay 330 remains operated over its locking path; at contacts 342 opens the circuit to the Automatic Desk Start Circuit. Motor magnet 110 self-interrupter steps the wipers of rotary switch 115 to their normal positions to thereby operate the On springs and restore the motor magnet 110. Relay 130 restoring, at contacts 132 opens to extinguish the Delay Answer Lamp L1; at contacts 133 and 134 prepares a circuit to relay 120; contacts 135 and 137 open to extinguish the Trouble Lamp and cut-off the Office Alarm respectively; at contacts 136 the circuit to relay 350 is opened however, relay 350 remains operated over its locking path.

The intercept operator answers the call and releases in a manner similar to that previously disclosed.

It is to be understood now that modifications could be made in the embodiment of the invention, however, it is intended to cover in the appended claims all such modifications as fall within the true spirit and scope of the invention. For instance, it is to be understood that a mechanical recorder could be associated with both Service 1 and Service 2, and likewise, an intercept operator could be associated with both Service 1 and Service 2 without departing from the true spirit and scope of the invention.

Having described my invention in detail, what I claim and desire to have protected by issuance of Letters Patent of the United States is:

1. In a telephone system, an intercept trunk circuit, a plurality of numerical switches, a mechanical recorder answering circuit, means for extending connections between one of said numerical switches and said trunk circuit including a pair of conductors forming a loop circuit over which a plurality of series of digital impulses are received, a rotary switch in said intercept trunk circuit including wipers and a plurality of wiper positions, circuit means controlled over a certain position of said rotary switch wipers for extending said loop circuit to said mechanical recorder answering circuit, means for automatically stepping said rotary switch wipers responsive to seizure of said intercept trunk circuit, means for stopping the automatic stepping of said rotary switch wipers responsive to the receipt of each series of digital impulses over said loop circuit and for again causing automatic stepping of said rotary switch wipers responsive to the termination of each series of digital impulses, a self-interrupter circuit completed to said rotary switch to step said wipers to a normal position responsive to the receipt of each said series of digital impulses to absorb said digital impulses, said automatic stepping of said rotary switch moving its wipers to said certain position responsive only a certain time after the termination of the last of said series of digital impulses to extend said loop circuit to said mechanical recorder to thereby cause cycles of recorded information to be transmitted by said mechanical recorder over said loop circuit, said rotary switch operated upon transmission of each cycle of recorded information to simultaneously step said wipers one step, circuit means completed upon the transmission of a predetermined number of cycles of recorded information to step said wipers to a predetermined position to initiate an alarm.

2. In a telephone system, an intercept trunk circuit, a plurality of numerical switches, a mechanical recorder answering circuit and an intercept operator answering circuit, means for extending connections between one of said numerical switches and said trunk circuit including a pair of conductors forming a loop circuit over which a plurality of series of digital impulses are received, a rotary switch in said intercept trunk circuit including wipers and a plurality of wiper positions, circuit means controlled in a certain position of said rotary switch wipers for extending said loop circuit to said mechanical recorder answering circuit, means for automatically stepping said rotary switch wipers responsive to seizure of said intercept trunk circuit, means for stopping the automatic stepping of said rotary switch responsive to the receipt of each series of digital impulses over said loop circuit and said automatic stepping means again stepping said wipers of said rotary switch responsive to the termination of each series of digital impulses, a self-interrupter circuit completed to said rotary switch to step said wipers to a normal position responsive to each series of digital impulses to absorb said digital impulses, said first means operating said rotary switch wipers to said certain position only responsive a certain time after the termination of the last series of digital impulses to extend said loop circuit to said mechanical recorder to thereby cause cycles of recorded information to be transmitted by said mechanical recorder over said loop circuit, said rotary switch operated upon transmission of each cycle of recorded information to step said wipers one step, circuit means completed upon the transmission of a predetermined number of cycles of recorded information to step said wipers to a predetermined position to initiate an alarm, a second self-interrupter circuit completed to said rotary switch responsive to the initiation of said alarm to step said wipers to the normal position and to in turn transfer the loop circuit to said intercept operator's circuit.

3. In a telephone system, an intercept trunk circuit, a plurality of local type and toll type numerical switches, a mechanical recorder answering circuit and an intercept operator's answering circuit, means for extending connections between either type of numerical switch and said trunk circuit including a pair of conductors forming a loop circuit over which a plurality of series of digital impulses are received, a rotary switch in said intercept trunk circuit including wipers and a plurality of wiper positions, circuit means controlled in a certain position of said rotary switch wipers for extending said loop circuit to either answering circuit depending upon the type of numerical switch accessing said intercept trunk circuit, means for automatically stepping said rotary switch wipers responsive to seizure of said intercept trunk circuit by either of said type of numerical switch, means for stopping said automatic stepping of said wipers responsive to the receipt of each series of digital impulses over said loop circuit, said automatic stepping means being again rendered effective responsive to the termination of each series of digital impulses, a self-interrupter circuit completed to said rotary switch to step said wipers to a normal position responsive to the receipt of each said series of digital impulses to absorb said digital impulses, said first means operating said rotary switch wipers to said certain position responsive only a certain time after the termination of the last of said series of digital impulses to extend said loop circuit to either of said answering circuits depending upon the type of call made, cycles of recorded information being transmitted by said mechanical recorder in one instance over said loop circuit on local calls, said rotary switch operated upon transmission of each cycle of recorded information to step said wipers one step, circuit means completed upon the transmission of a predetermined number of cycles of recorded information to step said wipers to a predetermined position to initiate an alarm, a second self-interrupting circuit completed to said rotary switch responsive to the initiation of said alarm to self-step said wipers to the normal position and to in turn transfer the loop circuit to said intercept operator's position.

4. In a telephone system, an intercept trunk circuit, a rotary switch in said intercept trunk circuit including wipers and a plurality of wiper positions, a plurality of numerical switches, means for extending connections between unused levels of said numerical switches and said intercept trunk circuit including a pair of conductors forming a loop circuit over which a plurality of series of digital impulses are received, a mechanical recorder answering circuit, circuit means controlled over a certain position on said rotary switch for extending said loop circuit to said mechanical recorder answering circuit to thereby cause cycles of recorded information to be transmitted by said mechanical recorder over said loop circuit, a certain number of the said wiper positions on said rotary switch for timing the inter-digital pause between each of said series of digital impulses to prevent the extension of said loop circuit to said mechanical recorder answering circuit, means for permitting stepping of said wipers to said certain position of said rotary switch only a certain time after the last series of digital impulses, another certain position on said rotary switch for controlling an alarm, said rotary switch operated upon transmission of each cycle of recorded information to step said wipers one step, the transmission of a predetermined number of recorded information cycles causing said wipers of said rotary switch to step to said second certain position to thereby initiate the operation of the alarm.

5. In a telephone system, the combination as claimed in claim 4, including circuit means completed responsive to the initiation of said alarm to transfer said loop circuit to an operator's position.

6. In a telephone system, an intercept trunk circuit, a plurality of numerical switches, a rotary switch in said intercept trunk circuit including wipers and a plurality of wiper positions, means for extending connections between said numerical switches and said trunk circuit including a pair of conductors forming a loop circuit over which a plurality of series of digital impulses are received, an operator's answering circuit, circuit means controlled over a certain position on said rotary switch for extending said loop circuit to said operator's answering circuit, a certain number of said wiper positions on said rotary switch for timing the inter-digital pause between each of said series of digital impulses to control the extension of said loop circuit to said operator's answering circuit, means for automatically stepping said rotary switch wipers responsive to seizure of said intercept trunk circuit, means for stopping the automatic stepping of said rotary switch wipers responsive to the receipt of each series of digital impulses over said loop circuit and for again causing automatic stepping of said rotary switch wipers responsive to the termination of each series of digital impulses, a self-interrupter circuit completed to said rotary switch to step said wipers to a normal position responsive to the receipt of each said series of digital impulses, means for permitting said automatic stepping of said wipers over said certain number of said wiper positions and to said certain position of said rotary switch only after the inter-digital pause between any series of digital impulses exceeds a predetermined time interval.

7. In a telephone system, an intercept trunk circuit, a plurality of local and toll type numerical switches, a two level rotary switch in said intercept trunk circuit including wipers and a plurality of wiper positions, means for extending connections between levels of said local or said toll numerical switches and said trunk including a pair of conductors forming a loop circuit over which a plurality of series of digital impulses are received, a mechanical recorder answering circuit and an operator's answering circuit, circuit means controlled in a certain position of a first level of said rotary switch for extending said loop circuit to said mechanical recorder or to said operator's circuit and operating a signal thereat depending on the type of numerical switch having seized said trunk circuit, stepping of the switch over a certain number of said wiper positions on said rotary switch causing a timing of the inter-digital pause between each series of digital impulses to thereby prevent said signalling or extending said loop circuit to said mechanical recorder or said operator's circuit before said positions have been passed over, means for permitting stepping of said wipers to said certain position on said first level of said rotary switch only a predetermined time after the last series of digital impulses, a certain position on said second level of said rotary switch for controlling an alarm, timing means for operating said rotary switch wipers to said second level certain position to initiate operation of said alarm after a predetermined time and responsive to a mechanical recorder failure or a failure to respond to said signal by an operator at said operator's circuit.

8. In a telephone system, an intercept trunk circuit, a plurality of numerical switches, a rotary switch in said intercept trunk circuit including wipers and a plurality of wiper positions, means for extending connections between said numerical switches and said trunk circuit including a pair of conductors forming a loop circuit over which a plurality of series of digital impulses are received, an operator's answering circuit, circuit means controlled over a certain position on said rotary switch for extending said loop circuit to said operator's answering circuit, a certain number of said wiper positions on said rotary switch for timing the inter-digital pause between each of said series of digital impulses to control the extension of said loop circuit to said operator's answering circuit, means for automatically stepping said rotary switch wipers responsive to seizure of said intercept trunk circuit, means for stopping the automatic stepping of said rotary switch wipers responsive to the receipt of each series of digital impulses over said loop circuit and for again causing automatic stepping of said rotary switch wipers responsive to the termination of each series of digital impulses, a self-interrupter circuit completed to said rotary switch to step said wipers to a normal position responsive to the receipt of each said series of digital impulses, a second certain position on said rotary switch for controlling an alarm, means for permitting said automatic stepping of said wipers over said certain number of said wiper positions and to said first certain position on said rotary switch only after the inter-digital pause between any series of digital impulses exceeds a predetermined time interval, said automatic stepping maintained effective to step said rotary switch responsive to the extension of said loop circuit to said operator's answering circuit, a second certain number of said wiper positions on said rotary switch for timing the answering by the operator upon said loop circuit being extended to said operator's answering circuit, said automatic stepping of said wipers over said second certain number of wiper positions and to said second certain position of said rotary switch effective responsive to the failure of said operator to answer said call before a predetermined time interval to initiate the operation of said alarm.

9. In a telephone system, an intercept trunk circuit, a plurality of numerical switches, a rotary switch in said intercept trunk circuit including wipers and a plurality of wiper positions, means for extending connections between said numerical switch and said trunk circuit including a pair of conductors forming a loop circuit over which a plurality of series of digital impulses are received, a mechanical recorder answering circuit, circuit means controlled over a certain position on said rotary switch for extending said loop circuit to said mechanical recorder answering circuit to thereby cause cycles of recorded information to be transmitted by said mechanical recorder over said loop circuit, a certain number of said wiper positions on said rotary switch for timing the inter-digital pause between each of said series of digital impulses to control the extension of said loop circuit to said mechanical recorder answering circuit, means for automatically stepping said rotary switch wipers responsive to seizure of said intercept trunk circuit, means for stopping the automatic stepping of said rotary switch wipers responsive to the receipt of each series of digital impulses over said loop circuit and for again causing automatic stepping of said rotary switch wipers responsive to the termination of each series of digital impulses, a self-interrupter circuit completed to said rotary switch to step said wipers to a normal position responsive to the receipt of each said series of digital impulses, means for permitting said automatic stepping of said wipers over said certain number of said wiper positions and to said certain position of said rotary switch only after the inter-digital pause between any series of digital impulses exceeds a predetermined time interval, a second certain position on said rotary switch for controlling an alarm, said rotary switch operated upon transmission of each cycle of recorded information to step said wipers one step, and circuit means completed upon the transmission of a predetermined number of cycles of information to step said wipers to said second certain position to initiate an alarm.

10. In a telephone system, the combination as claimed in claim 9, including circuit means completed responsive to the initiation of said alarm to transfer said loop circuit to an operator's circuit.

11. In a telephone system, an intercept trunk circuit, a plurality of local and toll type numerical switches, a two level rotary switch in said intercept trunk circuit including wipers and a plurality of wiper positions, means for extending connections between levels of said local or said toll numerical switches and said trunk circuit including a pair of conductors forming a loop circuit over which a plurality of series of digital impulses are received, a mechanical recorder answering circuit and an operator's answering circuit, circuit means controlled in a certain position of a first level of said rotary switch for extending said loop circuit to said mechanical recorder by the local type numerical switches having seized said trunk circuit to thereby cause cycles of recorded information to be transmitted by said mechanical recorder over said loop circuit, circuit means controlled in said certain position of said first level of said rotary switch for extending said loop circuit to said operator's answering circuit by the toll type numerical switches having seized said trunk circuit, a certain number of said wiper positions of said first level on said rotary switch causing a timing of the inter-digital pause between each series of digital impulses to thereby prevent extending said loop circuit to said mechanical recorder circuit or said operator's answering circuit before said certain positions have been passed over, means for permitting stepping of said wipers to said certain position on said first level of said rotary switch only a predetermined time after a series of digital impulses, a first certain position and a second certain position on said second level of said rotary switch for controlling an alarm, said rotary switch operated upon transmission of each cycle of recorded information to step said wipers one step, the transmitting of a predetermined number of recorded information cycles causing said wipers of said rotary switch to step to said second level first certain position to thereby initiate the operation of the alarm, timing means for operating said rotary switch wipers to said second level second certain position to initiate operation of said alarm after a predetermined time and responsive to a mechanical recorder failure or a failure to respond by said operator at said operator's position.

12. In a telephone system, an intercept trunk circuit, an operator's position, a plurality of numerical switches, a two level rotary switch in said intercept trunk circuit including wipers and a plurality of bank contacts, means for extending connections between levels of said numerical switches and said trunk including a pair of conductors forming a loop circuit over which a plurality of series of digital impulses are received, means for automatically stepping said rotary switch wipers responsive to seizure of said intercept trunk circuit, means for stopping the automatic stepping of said rotary switch responsive to receipt of each series of digital impulses over said loop circuit and for again causing automatic stepping of said rotary switch responsive to the termination of each series of digital impulses, a self-interrupter circuit completed to said rotary switch to step said wipers to a normal position responsive to the receipt of each said series of digital impulses to absorb said digital impulses, a certain bank contact on the first level of said rotary switch for controlling the extension of said loop circuit to said operator's position, a certain bank contact on the second level of said rotary switch for initiating the operation of an alarm, a certain number of the bank contacts on the first level of the rotary switch for timing the inter-digital pause between series of digital impulses to prevent the extension of said loop circuit to said operator's position before a predetermined time, means for permitting stepping of said wipers to said certain bank contact on said one level of said rotary switch only a certain time after the last series of digital impulses, a certain number of the bank contacts on the second level of the rotary switch for timing the answering of a call by an operator at said operator's position, means for permitting stepping of said wipers over said certain number of bank contacts to said certain bank contact on said second level of said rotary switch responsive to the failure of said operator to answer said call after a predetermined time to thereby initiate the operation of the alarm.

13. In a telephone system, an intercept trunk circuit, a plurality of numerical switches, a two level rotary switch in said intercept trunk circuit including wipers and a plurality of wiper positions, means for extending connections between levels of said numerical switches and said trunk circuit including a pair of conductors forming a loop circuit over which a plurality of series of digital impulses are received, an operator's answering circuit, circuit means controlled in a certain position of a first level of said rotary switch for extending said loop circuit to said operator's answering circuit, a certain number of said wiper positions of said first level on said rotary switch for causing a timing of the inter-digital pause between each series of digital impulses to thereby prevent the extension of said loop circuit to said operator's answering circuit before a certain time has elapsed, means for automatically stepping said rotary switch wipers responsive to seizure of said intercept trunk circuit, means for stopping the automatic stepping of said rotary switch wipers responsive to the receipt of each series of digital impulses over said loop circuit, said automatic stepping means being again rendered effective responsive to the termination of each series of digital impulses, a self-interrupter circuit completed to said rotary switch to step said wipers to a normal position responsive to each series of digital impulses, a certain position on said second level of said rotary switch for controlling an alarm, means for permitting said automatic stepping of said wipers over said certain number of said wiper positions and to said first certain position on said first level only after the inter-digital pause between any series of digital impulses exceeds a predetermined time interval, said automatic stepping means maintained effective to step said wiper of said rotary switch responsive to the extension of said loop circuit to said operator's answering circuit, a certain number of said wiper positions on the second level of said rotary switch for timing the answering by an operator upon said loop circuit being extended to said operator's answering circuit, said automatic stepping of said wipers over said certain number of second level wiper positions and to said second level certain position effective responsive to the failure of said operator to answer said call after a predetermined time interval to initiate the operation of said alarm.

References Cited in the file of this patent

UNITED STATES PATENTS

| | | |
|---|---|---|
| 1,558,872 | Helwig | Oct. 27, 1925 |
| 2,710,311 | Kessler | June 7, 1955 |
| 2,764,636 | Gray | Sept. 25, 1956 |